United States Patent
Sanchez et al.

(10) Patent No.: US 10,227,003 B1
(45) Date of Patent: Mar. 12, 2019

(54) SYSTEMS AND METHODS FOR NOTIFYING INDIVIDUALS WHO ARE UNFIT TO OPERATE VEHICLES

(71) Applicant: STATE FARM MUTUAL AUTOMOBILE INSURANCE COMPANY, Bloomington, IL (US)

(72) Inventors: Kenneth J. Sanchez, Bloomington, IL (US); Aaron Scott Chan, Lisle, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/180,991

(22) Filed: Jun. 13, 2016

(51) Int. Cl.
  *G08B 21/00* (2006.01)
  *B60K 28/06* (2006.01)
  *G06K 9/00* (2006.01)

(52) U.S. Cl.
  CPC ........ *B60K 28/066* (2013.01); *G06K 9/00845* (2013.01); *B60W 2540/24* (2013.01); *B60W 2540/26* (2013.01)

(58) Field of Classification Search
  CPC .............. B60K 28/066; B60K 9/00845; B60K 2350/1096; G08B 21/06; A61B 5/18
  USPC ........................................................ 340/576
  See application file for complete search history.

(56) References Cited

U.S. PATENT DOCUMENTS

| | | |
|---|---|---|
| 6,313,749 B1 | 11/2001 | Horne et al. |
| 6,661,345 B1 | 12/2003 | Bevan et al. |
| 7,054,723 B2 | 5/2006 | Seto et al. |
| 7,138,922 B2 | 11/2006 | Strumolo et al. |
| 7,719,431 B2 | 5/2010 | Bolourchi |
| 7,835,834 B2 | 11/2010 | Smith et al. |
| 8,009,051 B2 | 8/2011 | Omi |
| 2004/0017106 A1 | 1/2004 | Aizawa et al. |
| 2004/0090334 A1 | 5/2004 | Zhang et al. |
| 2005/0149263 A1* | 7/2005 | Chow ..................... B60Q 9/008 701/301 |
| 2007/0080816 A1 | 4/2007 | Haque et al. |
| 2008/0291008 A1 | 11/2008 | Jeon |
| 2009/0169068 A1* | 7/2009 | Okamoto ............. B60K 28/063 382/118 |
| 2010/0028210 A1* | 2/2010 | Ozaki .................. B60K 28/063 422/84 |
| 2010/0131304 A1 | 5/2010 | Collopy et al. |

(Continued)

OTHER PUBLICATIONS tucsonlocalmedia.com, "Opioids could become the next big crisis in traffic safety," Jan. 13, 2016. Retrieved from the Internet on Jan. 15, 2016: http://www.tucsonlocalmedia.com/features/article_15685efe-ba10-11e5-bc43-c7cff06d9ea.

*Primary Examiner* — Mark S Rushing
(74) *Attorney, Agent, or Firm* — Marshall, Gerstein & Borun LLP; Randall G. Rueth

(57) ABSTRACT

Systems and methods for improving vehicular safety are provided. According to certain aspects, an electronic device may receive and analyze image data depicting an individual located within a vehicle. The electronic device may also access certain data related to a condition of the individual, and may accordingly determine whether the individual is fit to operate the vehicle. If the individual is unfit to operate the vehicle, the electronic device may generate and display a notification that warns of the dangers of operating the vehicle and encourages the individual to not operate the vehicle.

14 Claims, 5 Drawing Sheets

(56) References Cited

U.S. PATENT DOCUMENTS

| | | | |
|---|---|---|---|
| 2010/0214087 A1 | 8/2010 | Nakagoshi et al. | |
| 2011/0304465 A1* | 12/2011 | Boult | B60K 28/06 340/576 |
| 2013/0038437 A1 | 2/2013 | Talati et al. | |
| 2015/0258892 A1* | 9/2015 | Wu | B60K 28/06 340/576 |
| 2015/0375756 A1* | 12/2015 | Do | B60W 50/14 701/1 |
| 2016/0148523 A1* | 5/2016 | Winston | G09B 7/00 434/236 |

* cited by examiner

SYSTEMS AND METHODS FOR NOTIFYING INDIVIDUALS WHO ARE UNFIT TO OPERATE VEHICLES

FIELD

The present disclosure is directed to assessing the state of individuals set to operate vehicles. More particularly, the present disclosure is directed to systems and methods for automatically determining the state of the individuals and providing various warnings and notifications.

BACKGROUND

Individuals have been operating and traveling in vehicles as a means of transportation for decades. Generally, some individuals exercise more care or caution than do other individuals when operating vehicles. In particular, individuals may sometimes operate vehicles when they are unfit to do so, such as if the individuals are intoxicated or drowsy. This generally unsafe vehicle operation leads to accidents, injuries, or other negative effects.

Recently, vehicles have experienced an increased prevalence of electronic devices and sensors capable of sensing and generating data associated with vehicle operation. However, even with this increasing prevalence, there are no existing solutions for determining when specific drivers are operating vehicles in certain situations. For example, there is no existing solution for accurately determining when an individual is unfit to drive and, if the individual is unfit, for providing warnings or notifications that may dissuade the individual from operating the vehicle. Accordingly, there is an opportunity for systems and methods to leverage various data to identify individuals and convey warnings to the individuals if the individual are unfit to operate vehicles.

SUMMARY

According to embodiments, a computer-implemented method in an electronic device of improving safety of a vehicle is provided. The method may include receiving image data from at least one image sensor located within the vehicle, analyzing, by a computer processor, the image data to identify an individual located within the vehicle, accessing sensor data from a sensor associated with the vehicle, and analyzing the sensor data to determine a current state of the individual. The method may further include, in response to analyzing the sensor data, generating a notification including information associated with the current state of the individual, and causing the notification to be displayed on the electronic device.

In another embodiment, a system in an electronic device for improving safety of a vehicle is provided. The system may include a user interface, a memory configured to store non-transitory computer executable instructions, and a processor configured to interface with the memory. The processor is configured to execute the non-transitory computer executable instructions to cause the processor to receive image data from at least one image sensor located within the vehicle, analyze the image data to identify an individual located within the vehicle, access sensor data from a sensor associated with the vehicle, and analyze the sensor data to determine a current state of the individual. The processor is further configured to, in response to analyzing the sensor data, generate a notification including information associated with the current state of the individual, and cause the user interface to display the notification.

In a further embodiment, a computer readable storage medium having computer-executable instructions stored therein is provided. The computer-executable instructions, when executed, cause a machine to receive image data from at least one image sensor located within a vehicle, analyze the image data to identify an individual located within the vehicle, access sensor data from a sensor associated with the vehicle, analyze the sensor data to determine a current state of the individual, in response to analyzing the sensor data, generate a notification including information associated with the current state of the individual, and cause the user interface to display the notification.

DETAILED DESCRIPTION

Figure 1A:
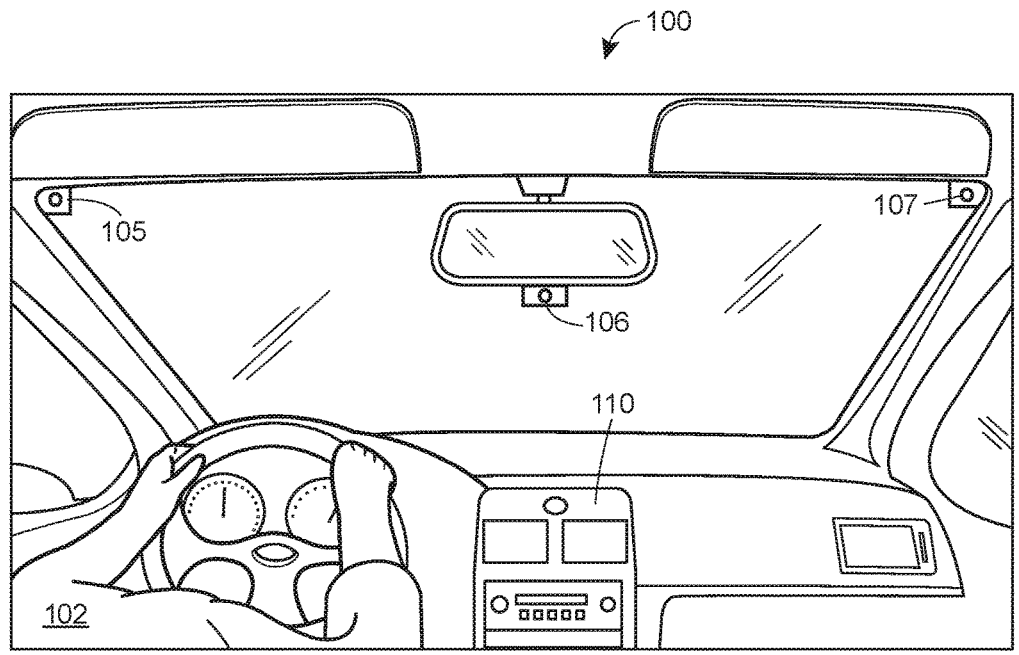
FIGS. 1A and 1B depict exemplary environments within a vehicle including various components configured to facilitate various functionalities, in accordance with some embodiments.

The present embodiments may relate to, inter alia, detecting, recording, compiling, and analyzing various vehicle data and sensor data related thereto. Existing vehicle operation environments support the generation of various vehicle data and related information. However, there is no way to properly associate the vehicle data with the related information in a meaningful manner to enable the data to be effectively communicated to relevant individuals in an effort to warn or notify of certain unsafe behaviors. The present embodiments improve these shortcomings by effectively, efficiently, and automatically detecting and compiling relevant vehicle data and certain sensor data related thereto.

According to certain aspects, a vehicle or an electronic device within the vehicle may be equipped with one or more image sensors. The image sensor(s) may be configured to capture image data of one or more individuals within the vehicle (e.g., an individual who is sitting in the driver's seat of a vehicle that is not currently operating, or a passenger of the vehicle), and transmit the captured image data to an electronic device. After receiving the image data, the electronic device may access stored user profile data that may include physical characteristics of a set of users. The electronic device may analyze the received image data by comparing the received image data to the stored user profile data to identify an individual depicted in the received image data, where the individual may be an operator, potential operator, or passenger of the vehicle. Additionally, the electronic device may analyze additional sensor data to determine a state of the individual, which may indicate whether the individual is unfit to operate the vehicle, such as if the individual is intoxicated or drowsy.

Further, the electronic device may further access, detect, or determine certain additional information associated with the state of the individual, such as the degree to which the individual may be unfit to operate the vehicle. The electronic device may generate a notification that includes information associated with the state of the individual. The electronic device may display the notification, enable the identified individual to view the notification, and facilitate any action presented by the notification and/or another action.

The systems and methods therefore offer numerous benefits. In particular, the individual is afforded the benefit of automatically being presented with notifications that warn of the dangers of operating the vehicle when the individual is unfit to operate the vehicle, where the notifications may dissuade the individual from operating the vehicle. Additionally, other individuals (as well as the individual him/herself) will not be exposed to a potentially hazardous situation, namely the potentially unfit individual operating the vehicle, when the individual chooses not to operate the vehicle. Further, an individual, entity, or the like may access any generated data (such as a vehicle operation log) for various purposes or applications. For example, an insurance provider may access the vehicle operation log and, based on the data included in the vehicle operation log, may determine a risk profile for the individual according to the state of the individual and any attempts to operate the vehicle. It should be appreciated that other benefits are envisioned.

The systems and methods discussed herein address a challenge that is particular to vehicle operation. In particular, the challenge relates to a difficulty in effectively dissuading individuals from operating vehicles when they are not in a proper state to operate the vehicles. This is particularly apparent with the increasing amount of vehicle sensors and types of data generated therefrom. In conventional environments, an individual's operation state may be determined by a sensor device (e.g., a breathalyzer) that detects the individual's blood alcohol content (BAC). In contrast, the systems and methods not only assess an individual's operation state, but the systems and methods also dynamically generate a notification that includes information associated with the current state of the individual, and communicate the notification to the individual. Therefore, because the systems and methods employ the collection, compiling, analyzing, and storing of data associated with the vehicle and/or the individual, the systems and methods are necessarily rooted in computer technology in order to overcome the noted shortcomings that specifically arise in the realm of vehicle operation.

Similarly, the systems and methods provide improvements in a technical field, namely, vehicle data compiling. Instead of the systems and methods merely being performed by hardware components using basic functions, the systems and methods employ complex steps that go beyond the mere concept of simply retrieving and combining data using a computer. In particular, the hardware components capture image data, analyze the image data in combination with stored user profile data to identify individual(s) depicted in the image data, analyze sensor data to determine a state of the individual, and generate and communicate a notification that includes information associated with the state of the individual. This combination of elements further impose meaningful limits in that the operations are applied to improve vehicle data compiling by assessing and associating multiple types of distinct data in a meaningful and effective way.

According to implementations, the systems and methods may support a dynamic, real-time or near-real-time analysis of any captured, received, and/or detected data. In particular, the electronic device may receive or capture image data in real-time or near real-time, and may automatically and dynamically analyze the captured image data by comparing the captured image data to stored profile data. The electronic device may also receive or access sensor data, and analyze the sensor data, in real-time or near-real-time, and may automatically and dynamically generate and communicate a notification that indicates relevant information. In this regard, the individual depicted in the image data is afforded the benefit of receiving an effective notification in real-time or near-real-time that serves to dissuade the individual from operating the vehicle.

FIG. 1A illustrates an example depiction of an interior of a vehicle 100 that may include various components associated with the systems and methods. In some scenarios, an individual 102 may operate (i.e., drive) the vehicle 100. Although the individual 102 is depicted as sitting in the driver's seat of the vehicle 100 and operating the vehicle 100, it should be appreciated that the individual 102 may be a passenger of the vehicle, and may sit in a front passenger seat or any of a set of rear passenger seats. In scenarios in which the individual 102 is a passenger of the vehicle 100, another individual may operate the vehicle 100. In some scenarios, the individual 102 may sit in the driver's seat of the vehicle 100 but may not be operating the vehicle 100 (e.g., the engine of the vehicle 100 may not be on).

As depicted in FIG. 1A, the interior of the vehicle 100 may support a set of image sensors 105, 106, 107. In the particular scenario depicted in FIG. 1A, each of the image sensors 105, 107 is located near a top corner of the interior of the vehicle 100, and the image sensor 106 is located below a rear view mirror. Although three (3) image sensors are depicted in FIG. 1A, it should be appreciated that additional or fewer image sensors are envisioned. Further, it should be appreciated that the image sensors 105, 106, 107 may be disposed or located at various alternate or additional portions of the vehicle 100, including on an exterior of the vehicle 100.

Each of the image sensors 105, 106, 107 may be configured to detect and convey information that constitutes an image. In particular, each of the image sensors 105, 106, 107 may generate digital image data according to the detected information, where the digital image data may be in the form of image data and/or video data. Although not depicted in FIG. 1A, the vehicle 100 may also include one or more microphones that may be disposed in one or more locations, where the microphones may be configured to capture audio data that may supplement the digital image data captured by the image sensors 105, 106, 107.

The vehicle 100 may also be configured with an electronic device 110 configured with any combination of software and hardware components. In some implementations, the electronic device 110 may be included as part of an on-board diagnostic (OBD) system or any other type of system configured to be installed in the vehicle 100, such as an original equipment manufacturer (OEM) system. The electronic device 110 may include a set of sensors configured to detect and record various telematics data associated with the vehicle 100. In some implementations, the electronic device 110 may be configured to communicate with (i.e., request, retrieve, or receive data from) a set of sensors disposed in other locations of the vehicle 100, such as each of the image sensors 105, 106, 107. Further, in some implementations, the electronic device 110 itself may be equipped with one or more image sensors.

According to embodiments, the set of sensors included in the electronic device 110 or otherwise configured to communicate with the electronic device 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. According to some embodiments, the set of sensors may also include a breathalyzer or similar type of device that may be configured to measure a BAC reading of the individual 102. It should be appreciated that additional sensors configured to detect a reading associated with a current state of the individual 102 are appreciated, including the image sensors 105, 106, 107. Further, in implementations, it should be appreciated that additional sensor devices that may be able to detect the same or alternate states of impairment (e.g., those caused by alcohol, marijuana, prescription drugs, controlled substances, opioids, energy products, etc.) are envisioned.

Figure 1B:
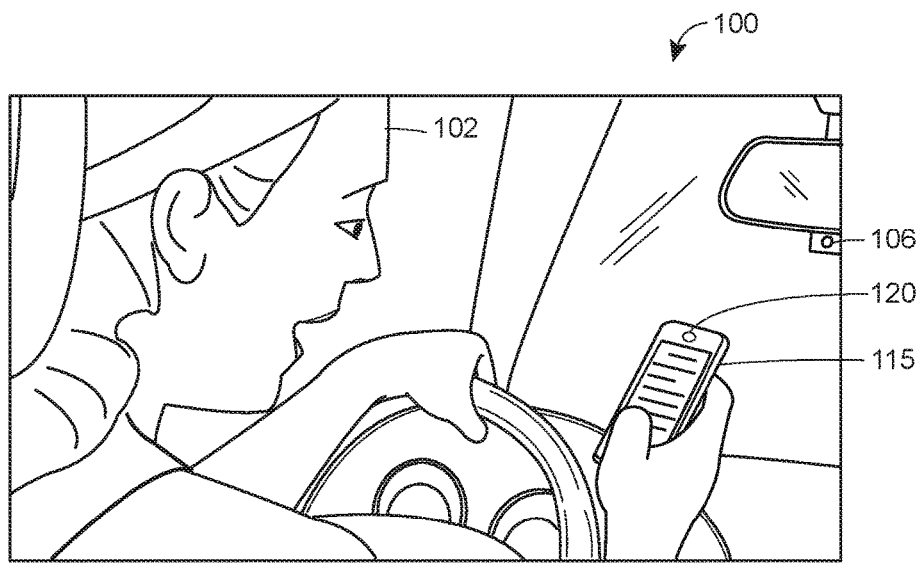

FIG. 1B depicts another configuration of an interior of the vehicle 100 that may include various components associated with the systems and methods. Similar to the depiction of FIG. 1A, the depiction of FIG. 1B illustrates the individual 102 who may be an operator or passenger of the vehicle (or an individual who is attempting to or otherwise wanting to operate the vehicle). The individual 102 may access and interface with an electronic device 115 that may be located within the vehicle 100. Although FIG. 1B depicts the individual 102 holding the electronic device 115, it should be appreciated that the electronic device 115 may be located within the vehicle 100 without the individual 102 contacting the electronic device 115. For example, the electronic device 115 may be secured within a mount.

According to embodiments, the electronic device 115 may be any type of electronic device such as a mobile device (e.g., a smartphone). It should be appreciated that other types of electronic devices and/or mobile devices are envisioned, such as notebook computers, tablets, phablets, GPS (Global Positioning System) or GPS-enabled devices, smart watches, smart glasses, smart bracelets, wearable electronics, PDAs (personal digital assistants), pagers, computing devices configured for wireless communication, and/or the like. The electronic device 115 may be configured with at least one image sensor 120 configured to capture digital image data, as discussed herein. The electronic device 115 may further include additional sensors, such as a clock, accelerometer, location module (e.g., GPS chip), gyroscope, compass, a breathalyzer, and/or other types of sensors.

In some implementations, the electronic device 115 may be configured to interface with additional components of the vehicle 100. In particular, the electronic device 115 may interface with the electronic device 110 and sensors thereof, any of the image sensors 105, 106, 107, and/or other components of the vehicle 100, such as any additional sensors that may be disposed within the vehicle 100. Further, although not depicted in FIG. 1A or 1B, the vehicle 100 and/or each of the electronic devices 110, 115 may be equipped with storage or memory capable of storing various data.

In operation, either of the electronic devices 110, 115 may be configured to receive or otherwise access image data captured by any combination of the image sensors 105, 106, 107, 120. The electronic devices 110, 115 may access user profile data that may be stored in the storage or memory, and may compare the received image data to the user profile data to identify the individual 102 who may be depicted in the image data. Further, the electronic devices 110, 115 may analyze the readings from a breathalyzer device and/or any supplemental image data to determine a current state of the individual 102 and, based on the current state, whether the individual 102 is fit to operate the vehicle 100.

The electronic devices 110, 115 may generate and display a notification that indicates relevant information, such as the determined current state of the individual 102, any metrics associated with the current state of the individual 102 (e.g., BAC reading), and/or other information. The notification may serve to warn the individual 102 of dangers associated with operating the vehicle and may therefore dissuade the individual from operating the individual. The individual 102 may interface with the electronic devices 110, 115 to view information, make selections, facilitate functionalities, and/or take other action. In some implementations, the electronic devices 110, 115 may automatically facilitate certain functions without input from the individual 102.

The electronic devices 110, 115 may also generate a vehicle operation log that may indicate the identified individual, the determined state of the individual, any generated notifications and information related thereto, and/or any actions performed or facilitated, where the vehicle operation log may be later accessed and examined for various applications. The electronic devices 110, 115 may also provide, in real-time, near real-time, or at another time, the generated vehicle operation log to a third party entity or device (e.g., an insurance provider).

According to embodiments, an individual may manually access and examine the vehicle operation log, or a computing device may automatically access and examine the vehicle operation log, to facilitate the various applications. For example, an insurance provider may automatically analyze the vehicle operation log to assess any determined operating states for an individual, and may generate a vehicle insurance policy quote accordingly. Accordingly, the insurance provider may generate the vehicle insurance policy quote in real-time or near-real-time to when the electronic device 110, 115 generates the vehicle operation log. Further, the insurance provider may provide the vehicle insurance policy quote to the individual 102, such as when the individual 102 is still operating the vehicle or otherwise in real-time or near-real-time to generation of the vehicle operation log, where the individual 102 may select to purchase the vehicle insurance policy.

Figure 2:
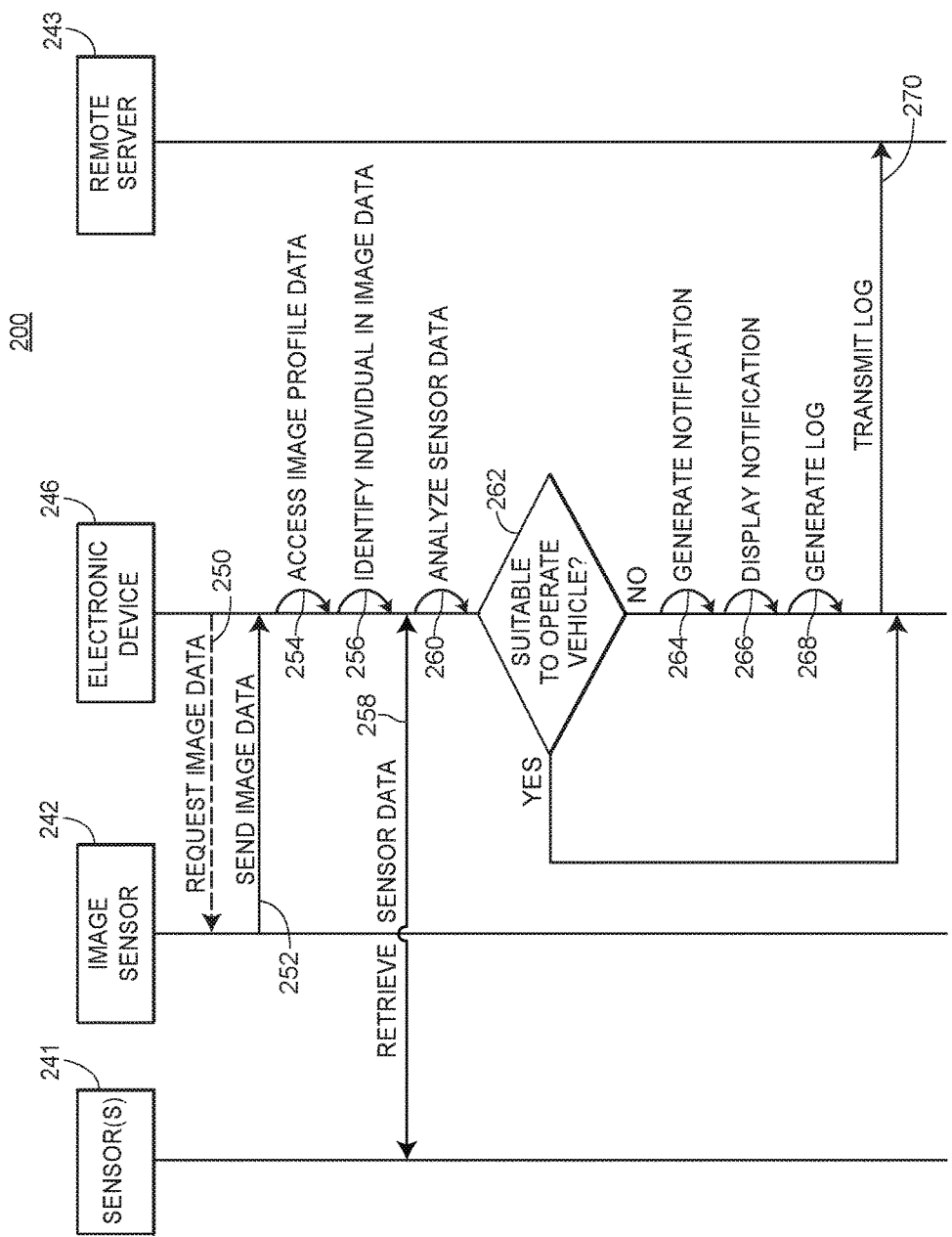
FIG. 2 depicts an exemplary signal diagram associated with analyzing data to identify individuals, assess a current state of the individuals, and perform various actions, in accordance with some embodiments.

FIG. 2 depicts a signal diagram 200 associated with facilitating certain functionalities associated with the systems and methods. The signal diagram 200 includes a set of components that may be associated with a vehicle: an image sensor 242 (such as one of the image sensors 105, 106, 107, 120 as discussed with respect to FIGS. 1A and 1B), an electronic device 246 (such as one of the electronic devices 110, 115 as discussed with respect to FIGS. 1A and 1B), one or more sensors 241, and a remote server 243. According to embodiments, one or both of the sensor(s) 241 or the image sensor 242 may be a component of (or separate from) the electronic device 246. Further, according to embodiments, the sensor(s) 241 may include a breathalyzer or similar device configured to detect a BAC reading for an individual (or other similar metric), as well as various motion sensors such as a gyroscope, accelerometer, and/or the like.

The signal diagram 200 may begin when the electronic device 246 optionally requests (250) image data from the image sensor 242. According to embodiments, the electronic device 246 may automatically request the image data periodically (e.g., once every ten seconds, once every minute, once every hour), or a user of the electronic device 246 may cause the electronic device 246 to request the image data. Further, the request may include a specified amount of image data and/or a specific time component (e.g., real-time image (s), real-time video, image(s) and/or video recorded five minutes ago). It should be appreciated that the image sensor 242 may be internal to or external from the electronic device 246.

The image sensor 242 may send (252) the image data to the electronic device 246. In one implementation, the image sensor 242 may automatically send the image data to the electronic device 246 in real-time or near real-time as the image sensor 242 captures the image data, and/or in response to a request from the electronic device 246. In another implementation, the image sensor 242 may send previously-captured image data to the electronic device 246, such as if the image sensor 242 interfaces with some type of memory or storage. In a further implementation, the image sensor 242 may send the image data in response to detecting that an individual has entered the vehicle, such as if the individual has sat down in the driver's seat of the vehicle. In this implementation, the image sensor 242 may be triggered by another sensor, such as a seat sensor. It should be appreciated that the image data may depict a vehicle operator or a passenger of the vehicle.

The electronic device 246 may access (254) image profile data associated with one or more individuals. In embodiments, the one or more individuals may be registered or otherwise associated with the vehicle (e.g., one or more registered drivers of the vehicle). The electronic device 246 may access the image profile data from local memory or from remote storage via a network connection. In one implementation, the electronic device 246 may access the image profile data from the remote server 243. According to embodiments, the image profile data may include a set of attributes, characteristics, and/or the like that may be related to the one or more individuals. For example, the image profile data may include facial recognition data related to relative positions, sizes, and/or shapes of the eyes, noses, cheekbones, jaws, and/or other features of the one or more individuals.

The electronic device 246 may identify (256) an individual depicted in the image data based on an analysis of the received image data and the accessed image profile data. According to the embodiments, the individual depicted in the image data may be the vehicle operator, a passenger of the vehicle, or an individual sitting in the driver's seat and wanting to operate the vehicle, where the electronic device 246 may discern whether the individual is the vehicle operator or a passenger based on a positioning of the individual as indicated in the image data. In one implementation, the electronic device 246 may perform a facial recognition algorithm or technique using the received image data to determine that the facial features of an individual depicted in the received image data matches those corresponding to an individual included in the image profile data. It should be appreciated that other types of calculations, algorithms, comparisons, or techniques are envisioned.

The electronic device 246 may retrieve (258) sensor data from the sensor(s) 241. In one implementation, if the sensor 241 is a breathalyzer device (or a similar device), the electronic device 246 may retrieve BAC reading from the breathalyzer device. In another implementation, the sensor data may be in the form of additional image data (where the sensor 241 may be the image sensor 242) that indicates various facial characteristics of the vehicle operator. It should be appreciated that additional types of sensors that generate relevant data are appreciated.

The electronic device 246 may analyze (260) the sensor data using one or more various techniques, calculations, algorithms, or the like. Generally, the electronic device 246 may analyze the sensor data to determine whether the individual is in a condition suitable or fit to operate the vehicle. The electronic device 246 may deem the individual not suitable to operate the vehicle if the individual is intoxicated, drowsy, and/or in other similar states. In a particular implementation, if the sensor data includes a BAC reading, the electronic device 246 may deem the individual intoxicated if the BAC reading exceeds a threshold amount (e.g., 0.08%). In another implementation, if the sensor data includes image data depicting certain facial characteristics, the electronic device 246 may deem the individual intoxicated or drowsy if the facial characteristics are associated with the drowsiness, intoxication, and/or another similar condition (e.g., bloodshot eyes, droopy eyes, droopy mouth). It should be appreciated that other analyses, thresholds, and the like for determining a suitability to operate a vehicle are envisioned.

Based on the analysis in (260), the electronic device 246 may determine (262) whether the individual is in a condition suitable to operate the vehicle. If the electronic device 246 determines that the individual is in a condition suitable to operate the vehicle ("YES"), processing may end or proceed to other functionality. If the electronic device 246 determines that the individual is not in a condition suitable to operate the vehicle ("NO"), the electronic device 246 may generate (264) a notification. According to embodiments, the notification may be intended to warn or notify the individual of his/her condition, where the notification may include various information. For example, if the electronic device 246 receives a BAC reading from a breathalyzer device, the notification may indicate the BAC reading. The notification may also include information that warns the individual of any risks or hazards associated with operating a vehicle while intoxicated, drowsy, and/or in other similar states. For example, the notification may indicate that operating the vehicle increases the risk of accidents. It should be appreciated that the notification may include additional and/or alternate content, such as any associated degrees or levels of the current state of the individual.

The electronic device 246 may also display (266) the notification, such as in a user interface. In displaying the notification, the electronic device 246 may cause the user interface to display a pop-up notification that includes the notification and the relevant information. In some embodiments, the electronic device 246 may initiate a dedicated application configured to display the notification. In an implementation, the electronic device 246 may initiate a haptic or audio alert in addition to displaying the notification. The individual may interface with the electronic device 246 to access or view the notification.

The electronic device may generate (268) a log that indicates any recorded or determined information in the form of a vehicle operator log or similar record that the electronic device 246 may update with new information. In particular, the vehicle operation log may include an identification of the individual, any determined state of the individual, a current time and/or a current date, a location of the vehicle, and/or any other information. The electronic device 246 may transmit (270) the vehicle operator log to the remote server 243, such as via any type of network connection. In certain embodiments, the network(s) may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network(s) may also be one or more private or local networks or dedicated frequency bands. Accordingly, a user or administrator associated with the remote server 243 may review the vehicle operator log and facilitate any related functionalities.

Figure 3:
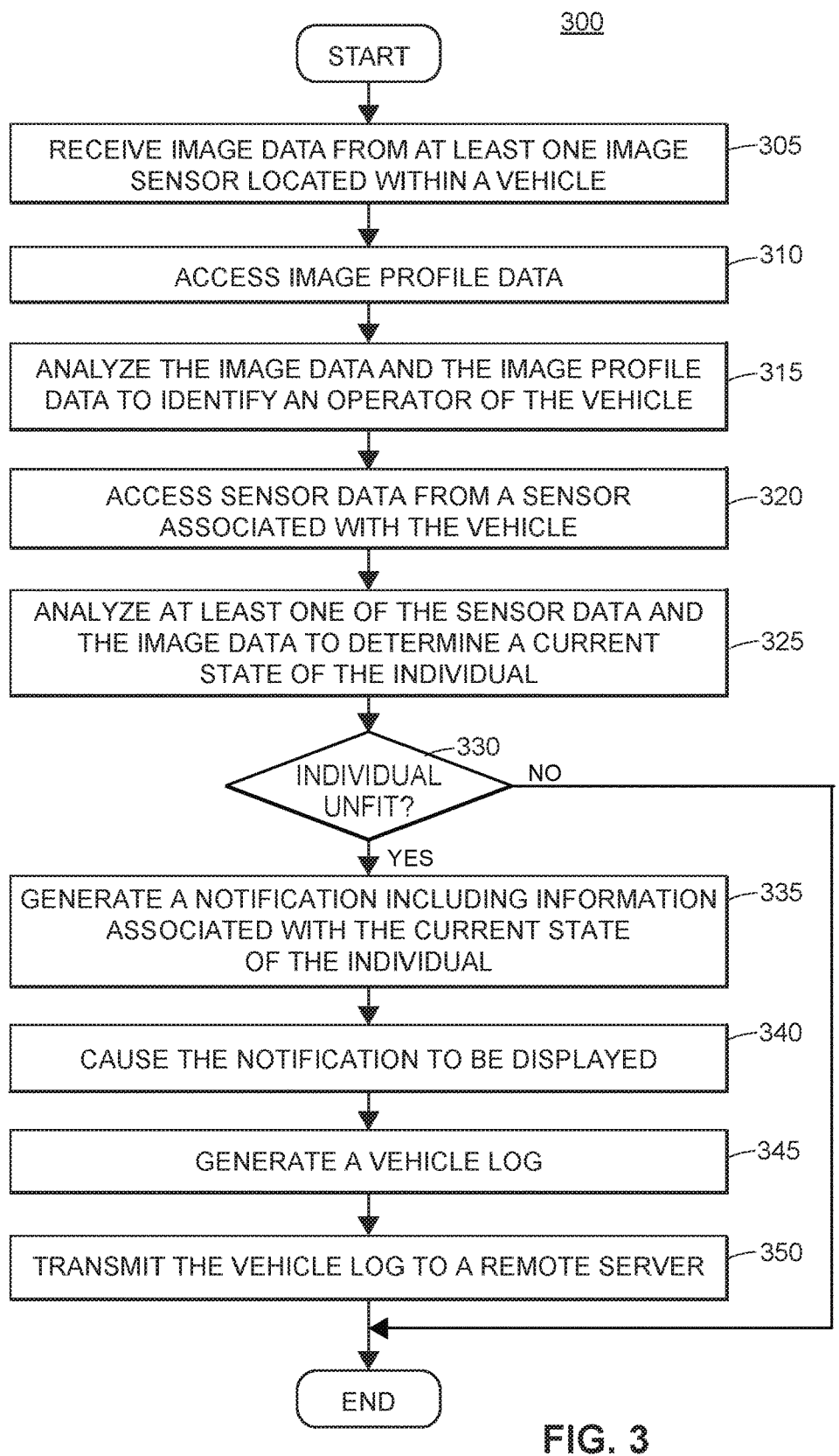
FIG. 3 depicts an exemplary flow diagram associated with analyzing various data to improve vehicle safety, in accordance with some embodiments.

FIG. 3 depicts is a block diagram of an exemplary method 300 of improving safety of a vehicle. The method 300 may be facilitated by an electronic device that may be located within a vehicle or incorporated as part of the vehicle. The electronic device may support execution of one or more dedicated applications that may facilitate the functionalities of the method 300. Further, the electronic device may enable a user or individual (e.g., an individual attempting to operate the vehicle) to make various selections and facilitate various functionalities.

The method 300 may begin when the electronic device receives (block 305) image data from at least one image sensor located within the vehicle. In embodiments, the image sensor may be a component of the electronic device itself or may be external to the electronic device. Further, the image data may be received in real-time or near real-time as the at least one image sensor captures the image data. After receiving the image data, the electronic device may access (block 310) image profile data associated with a set of individuals. In some embodiments, the set of individuals may be registered to or otherwise associated with the vehicle. Further, the image profile data may indicate physical characteristics (e.g., facial features) of the corresponding set of individuals.

The electronic device may analyze (block 315) the image data and the image profile data to identify an individual located within the vehicle who is depicted in the image data. In one implementation, the electronic device may perform a facial recognition analysis using the image data and the image profile data. It should be appreciated that alternate or additional analyses, techniques, calculations, algorithms, or the like are envisioned. In some embodiments, the electronic device may not have enough relevant data to identify the individual, in which case processing may return to block 305 at which additional image data may be received, or processing may end or proceed to other functionality.

The electronic device may further access (block 320) sensor data from a sensor associated with the vehicle. According to some embodiments, the sensor may be a breathalyzer or similar device configured to detect a BAC reading of the individual, where the sensor may be incorporated into the electronic device or otherwise configured to send sensor data to the electronic device. Further, in other embodiments, the sensor may be a specialized or dedicated sensor that is able to detect other various states of impairment (e.g., those caused by alcohol, marijuana, prescription drugs, controlled substances, energy products, etc.). In additional embodiments, the sensor may be an additional image sensor (or one of the at least one image sensors) configured to capture additional image data of the individual. The electronic device may analyze (block 325) at least one of the image data and the sensor data to determine a current state of the individual. According to embodiments, if the sensor is a breathalyzer or similar device, the current state may correspond to the BAC reading of the individual; or if the sensor is an additional image sensor, the current state may correspond to an alertness or drowsiness level of the individual (e.g., as depicted in the additional image data). Of course, the electronic device may analyze the sensor data in combination with the image data to determine the current state of the individual. For example, the electronic device may first analyze the image data (or the sensor data) to determine the current state of the individual, and then analyze the sensor data (or the image data) to corroborate the determined current state of the individual.

The electronic device may determine (block 330) whether the individual is unfit to operate the vehicle. In making the determination, the electronic device may compare the current state of the individual to one or more threshold values or conditions. For example, if the current state of the individual has an associated BAC reading, the electronic device may determine that the individual is unfit to operate the vehicle if the BAC reading exceeds a certain threshold, thereby indicating that the individual is intoxicated. For further example, if the current state of the individual has one or more indications of drowsiness or lack of alertness, the electronic device may determine that the individual is unfit to operate the vehicle if a certain amount of the indications are present in the sensor data.

If the electronic device determines that the individual is not unfit to operate the vehicle ("NO"), processing may end or proceed to other functionality. If the electronic device determines that the individual is unfit to operate the vehicle ("YES"), the electronic device may generate (block 335) a notification that includes information associated with the current state of the individual. In embodiments, the information may indicate any metrics determined from the sensor data (e.g., a BAC reading), as well as various textual and/or visual content that warns of dangers or risks associated with operating the vehicle and/or aims to dissuade the individual from operating the vehicle. The electronic device may cause (block 340) the notification to be displayed on the electronic device, such as via a user interface. In particular, the notification may be in the form of a pop-up notification or other type of alert or communication, and may automatically display on the electronic device or may be manually accessed by the individual. In some embodiments, the individual may access the notification via a dedicated application.

The electronic device may further generate (block 345) a vehicle log that may include any determine information and/or information that is included in the notification. In particular, the vehicle log may indicate the identified individual, the determined state of the individual, any generated notifications and information related thereto, and/or any actions performed or facilitated, where the vehicle operation log may be later accessed and examined for various applications. The electronic device may transmit (block 350) the vehicle log to a remote server via a network connection.

Figure 4B:
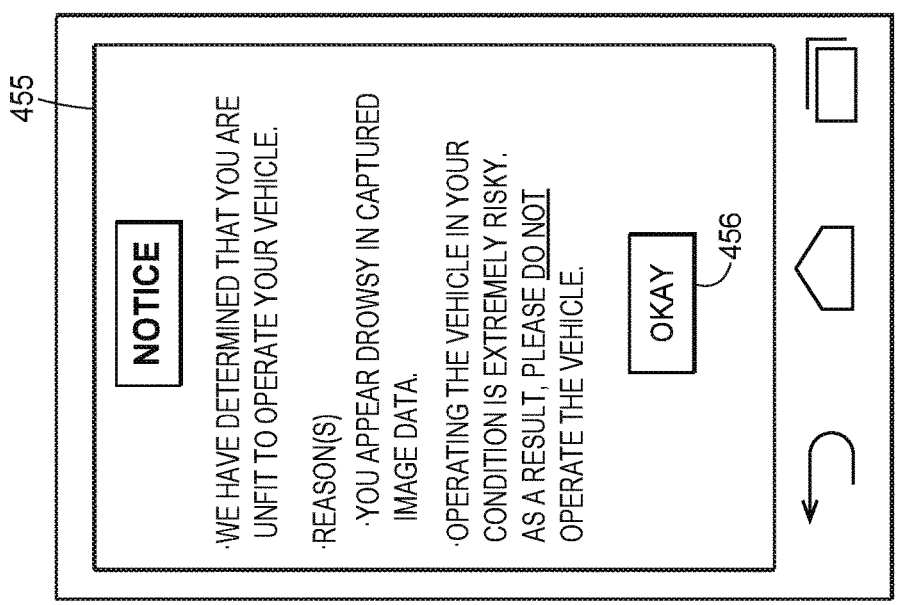
FIGS. 4A and 4B depict exemplary user interfaces associated with generated notifications to improve vehicle safety, in accordance with some embodiments.
Figure 4A:
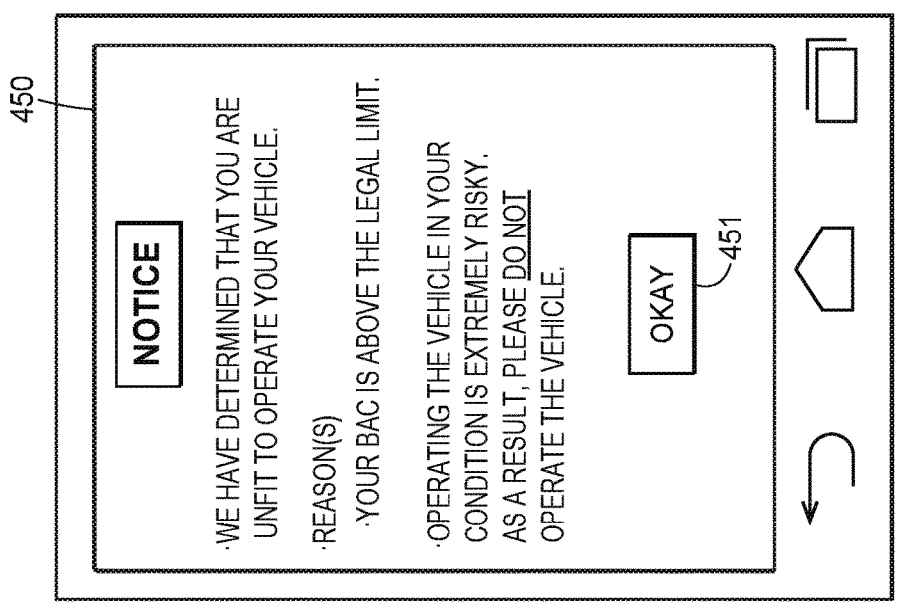

FIGS. 4A and 4B illustrate exemplary interfaces associated with determining and displaying information associated with options alternative to operating a vehicle. An electronic device (e.g., a mobile device, such as a smartphone) may be configured to display the interfaces and/or receive selections and inputs via the interfaces, where the electronic device may be associated with an operator of a vehicle, or may be integrated into the vehicle. For example, a dedicated application that is configured to operate on the electronic device may display the interfaces. It should be appreciated that the interfaces are merely exemplary and that alternative or additional content is envisioned.

FIG. 4A illustrates an interface 450 indicating a situation in which an individual is deemed unfit to operate a vehicle. In particular, the interface 450 indicates a reason that the individual is unfit: namely that the BAC reading for the individual is above the legal limit. The interface 450 further warns the individual that operating the vehicle is extremely risky, and encourages the individual to not operate the vehicle. The interface 450 includes an "OKAY" selection 451 that enables the accessing user to dismiss the interface 450 or otherwise proceed to other functionality.

FIG. 4B illustrates an interface 455 indicating another situation in which an individual is deemed unfit to operate a vehicle. In particular, the interface 455 indicates a reason that the individual is unfit: namely that the captured image data indicates that the individual is drowsy. The interface 455 further warns the individual that operating the vehicle is extremely risky, and encourages the individual to not operate the vehicle. The interface 455 includes an "OKAY" selection 456 that enables the accessing user to dismiss the interface 455 or otherwise proceed to other functionality.

Figure 5:
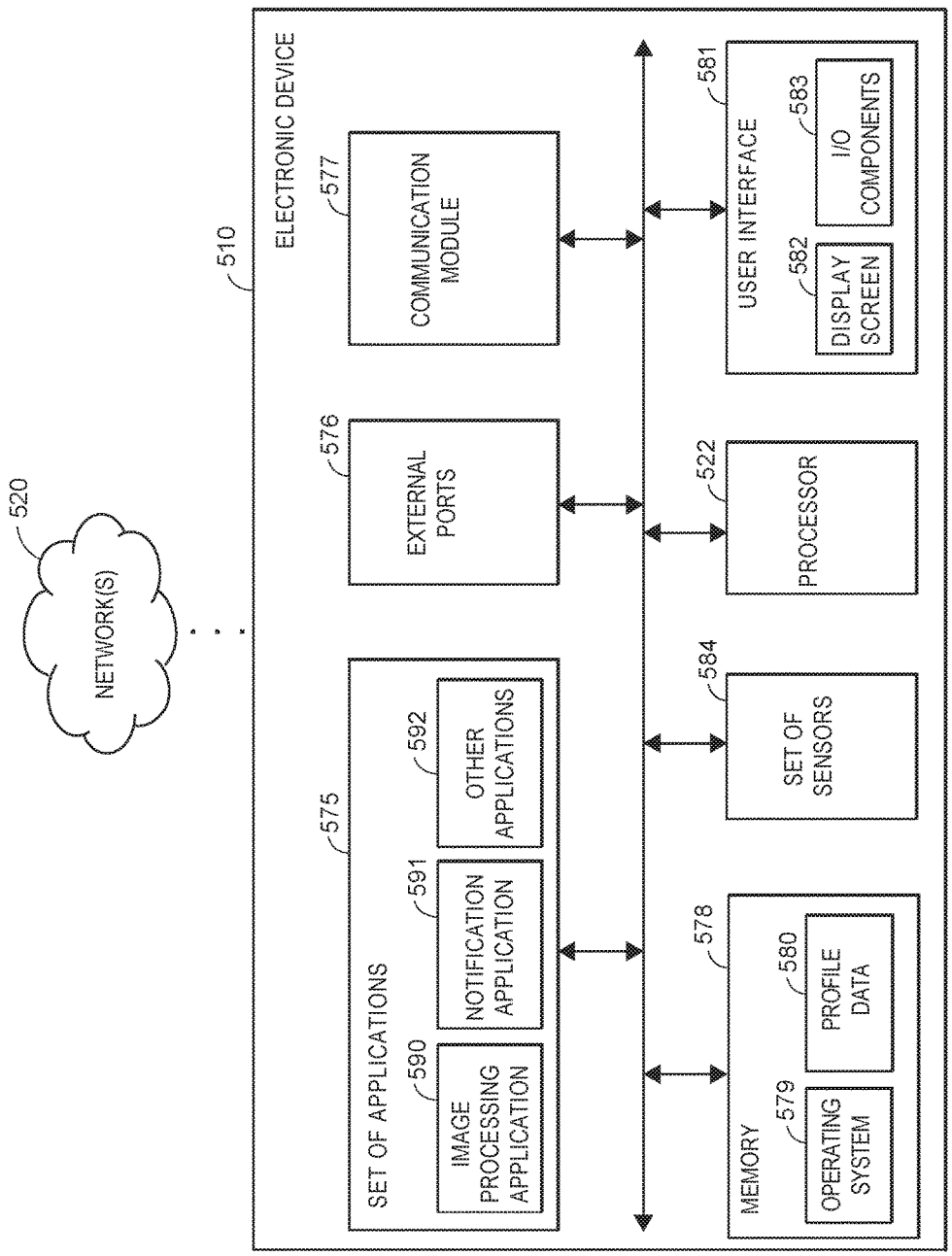
FIG. 5 is a block diagram of an exemplary electronic device, in accordance with some embodiments.

FIG. 5 illustrates a diagram of an exemplary mobile or other electronic device 510 (such as one of the electronic devices 110, 115 as discussed with respect to FIG. 1) in which the functionalities as discussed herein may be implemented. It should be appreciated that the electronic device 510 may be configured to be transported in a vehicle and/or connect to an on-board telematics platform of the vehicle, as discussed herein. Further, it should be appreciated that the electronic device 510 may be integrated into an on-board system of the vehicle.

The electronic device 510 may include a processor 522 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify individuals depicted in the image data, and a notification application 591 configured to generate and display notifications. It should be appreciated that one or more other applications 592 are envisioned, such as an application configured to determine various environmental information.

The processor 522 may interface with the memory 578 to execute the operating system 579 and the set of applications 575. According to some embodiments, the memory 578 may also include profile data 580 that may include data associated with a set of individuals associated with a vehicle. In some implementations, the image processing application 590 may interface with the profile data 580 to retrieve appropriate profile data and compare the profile data to received image data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, image data from a set of image sensors. For further example, the communication module 577 may transmit data to and receive data from a remote server via the network 520.

The electronic device 510 may further include a set of sensors 584. The processor 522 and the set of applications 575 may interface with the set of sensors 584 to retrieve and process the corresponding sensor data. The set of sensors 584 may include, for example, a location module, an accelerometer, a gyroscope, a compass, a weather sensors, one or more image sensors, and/or the like. In one particular implementation, a log generation application may use various data from the set of sensors 584 to generate vehicle operation logs.

The electronic device 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the electronic device 510 via the user interface 581 to review information and/or perform other functions. In some embodiments, the electronic device 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of improving safety of a vehicle, the method comprising:
   receiving a first set of image data from a first image sensor located at a first location within the vehicle;
   analyzing, by a computer processor, the first set of image data from the first image sensor to (i) identify an individual located within the vehicle, and (ii) determine that the individual is not in a condition suitable to operate the vehicle;
   after analyzing the first set of image data to determine that the individual is not in the condition suitable to operate the vehicle:
      receiving a second set of image data from a second image sensor located at a second location different from the first location within the vehicle, and
      analyzing the second set of image data from the second image sensor to corroborate the determination that the individual is not in the condition suitable to operate the vehicle;
   in response to analyzing the second set of image data from the second image sensor, generating a notification including (i) information associated with the analysis of at least one of the first set of image data from the first image sensor and the second set of image data from the second image sensor, and (ii) additional information identifying a set of risks associated with continued operation of the vehicle; and
   causing the notification to be displayed on the electronic device.

2. The computer-implemented method of claim 1, further comprising:
   receiving a reading from a breathalyzer device used by the individual, the reading indicating a blood alcohol content (BAC) of the individual; and
   determining, based on the BAC of the individual, that the individual is intoxicated.

3. The computer-implemented method of claim 1, wherein analyzing the first set of image data from the first image sensor comprises:
   analyzing the first set of image data from the first image sensor to determine that the individual is impaired;
   and wherein generating the notification comprises:
   generating the notification including an indication that the individual is impaired.

4. The computer-implemented method of claim 1, wherein analyzing the first set of image data from the first image sensor comprises:
   analyzing the first set of image data from the first image sensor to determine that the individual is drowsy;
   and wherein generating the notification comprises:
   generating the notification including an indication that the individual is drowsy.

5. The computer-implemented method of claim 1, further comprising:
   generating a vehicle log including the information associated with the analysis of at least one of the second set of image data from the second image sensor and the first set of image data from the first image sensor; and
   transmitting, via a network connection, the vehicle log to a remote server.

6. A system in an electronic device for improving safety of a vehicle, comprising:
   a user interface;
   a memory configured to store non-transitory computer executable instructions; and
   a processor configured to interface with the memory, wherein the processor is configured to execute the non-transitory computer executable instructions to cause the processor to:
      receive a first set of image data from a first image sensor located at a first location within the vehicle,
      analyze the first set of image data from the first image sensor to (i) identify an individual located within the vehicle, and (ii) determine that the individual is not in a condition suitable to operate the vehicle,
      after analyzing the first set of image data to determine that the individual is not in the condition suitable to operate the vehicle:
         receive a second set of image data from a second image sensor located at a second location different from the first location within the vehicle, and
         analyze the second set of image data from the second image sensor to corroborate the determination that the individual is not in the condition suitable to operate the vehicle,
      in response to analyzing the second set of image data from the second image sensor, generate a notification including (i) information associated with the analysis of at least one of the first set of image data from the first image sensor and the second set of image data from the second image sensor, and (ii) additional information identifying a set of risks associated with continued operation of the vehicle, and
      cause the user interface to display the notification.

7. The system of claim 6, wherein the processor is further configured to:
   receive a reading from a breathalyzer device used by the individual, the reading indicating a blood alcohol content (BAC) of the individual; and
   determine, based on the BAC of the individual, that the individual is intoxicated.

8. The system of claim 6, wherein to analyze the first set of image data from the first image sensor, the processor is configured to:
   analyze the first set of image data from the first image sensor to determine that the individual is impaired;
   and wherein to generate the notification, the processor is configured to:
   generate the notification including an indication that the individual is impaired.

9. The system of claim 6, wherein to analyze the first set of image data from the first image sensor, the processor is configured to:
   analyze the first set of image data from the first image sensor to determine that the individual is drowsy;
   and wherein to generate the notification, the processor is configured to:
   generate the notification including an indication that the individual is drowsy.

10. The system of claim 6, wherein the processor is further configured to:
    generate a vehicle log including the information associated with the analysis of at least one of the second set of image data from the second image sensor and the first set of image data from the first image sensor, and transmit, via a network connection, the vehicle log to a remote server.

11. A non-transitory computer readable storage medium having computer-executable instructions stored therein that when executed cause a machine to:
- receive a first set of image data from a first image sensor located at a first location within a vehicle,
- analyze the first set of image data from the first image sensor to (i) identify an individual located within the vehicle, and (ii) determine that the individual is not in a condition suitable to operate the vehicle,
- after analyzing the first set of image data to determine that the individual is not in the condition suitable to operate the vehicle:
  - receive a second set of image data from a second image sensor located at a second location different from the first location within the vehicle, and
  - analyze the second set of image data from the second image sensor to corroborate the determination that the individual is not in the condition suitable to operate the vehicle,
- in response to analyzing the second set of image data from the second image sensor, generate a notification including (i) information associated with the analysis of at least one of the second set of image data from the second image sensor and the first set of image data from the first image sensor, and (ii) additional information identifying a set of risks associated with continued operation of the vehicle, and
- cause the user interface to display the notification.

12. The computer readable storage medium of claim 11, wherein the computer-executable instructions when executed further cause the machine to:
- receive a reading from a breathalyzer device used by the individual, the reading indicating a blood alcohol content (BAC) of the individual; and
- determine, based on the BAC of the individual, that the individual is intoxicated.

13. The computer readable storage medium of claim 11, wherein to analyze the first set of image data from the first image sensor, the machine is configured to:
- analyze the first set of image data from the first image sensor to determine that the individual is impaired;
- and wherein to generate the notification, the machine is configured to:
- generate the notification including an indication that the individual is impaired.

14. The computer readable storage medium of claim 11, wherein to analyze the first set of image data from the first image sensor, the machine is configured to:
- analyze the first set of image data from the first image sensor to determine that the individual is drowsy;
- and wherein to generate the notification, the machine is configured to:
- generate the notification including an indication that the individual is drowsy.

* * * * *